(12) United States Patent
Dell et al.

(10) Patent No.: US 11,808,211 B2
(45) Date of Patent: Nov. 7, 2023

(54) MULTI-SPEED TRANSMISSION TO CONTROL VARIABLE APU SPEED AND CONSTANT GENERATOR OUTPUT FREQUENCY

(71) Applicant: Hamilton Sundstrand Corporation, Charlotte, NC (US)

(72) Inventors: Jonathan C. Dell, Elgin, IL (US); David S. Behling, Belvidere, IL (US); Glenn C. Lemmers, Jr., Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/716,106

(22) Filed: Apr. 8, 2022

(65) Prior Publication Data

US 2023/0323817 A1 Oct. 12, 2023

(51) Int. Cl.
*F02C 7/32* (2006.01)
*F01D 15/10* (2006.01)

(52) U.S. Cl.
CPC .............. *F02C 7/32* (2013.01); *F01D 15/10* (2013.01); *F05D 2220/50* (2013.01);
(Continued)

(58) Field of Classification Search
CPC ............ F05D 2220/50; F05D 2220/76; F05D 2220/7642; F05D 2260/4023;
(Continued)

(56) References Cited

U.S. PATENT DOCUMENTS 4,625,160 A 11/1986 Hucker
5,285,626 A 2/1994 Leeson
(Continued)

FOREIGN PATENT DOCUMENTS

EP 3032075 A1 6/2016

OTHER PUBLICATIONS

Vincenzo Madonna, Paolo Giangrande, Michael Galea "Electrical Power Generation in Aircraft: Review, Challenges, and Opportunities," IEEE Transactions On Transportation Electrification, vol. 4, No. 3, Sep. 2018, pp. 646-659. (Year: 2018).*
(Continued)

*Primary Examiner* — Todd E Manahan
*Assistant Examiner* — David P. Olynick
(74) *Attorney, Agent, or Firm* — CANTOR COLBURN LLP

(57) ABSTRACT

An aircraft power system includes an auxiliary power unit (APU), a transmission unit, and a generator. The APU is configured to output a first APU rotational power in response to determining a first condition and a second APU rotational power in response to a determining a second condition. The transmission unit is configured to receive the first APU rotational output power from the APU. The transmission unit outputs a transmission rotational power based on the first APU rotational output power and outputs the transmission rotational power based on the second APU rotational output power. The generator receives the transmission rotational power and produces an alternating current (AC) voltage having a target frequency based on the transmission rotational power.

15 Claims, 2 Drawing Sheets

(52) U.S. Cl.
CPC ............... *F05D 2220/7642* (2013.01); *F05D 2260/4023* (2013.01); *F05D 2260/4031* (2013.01); *F05D 2270/02* (2013.01)

(58) Field of Classification Search
CPC ......... F05D 2260/4031; F05D 2270/02; F02C 7/32; B64D 41/00; F16H 2200/0034; F01D 15/10
See application file for complete search history.

(56) References Cited

U.S. PATENT DOCUMENTS

| | | | |
|---|---|---|---|
| 7,704,177 | B2 | 4/2010 | Vornehm et al. |
| 7,942,079 | B2 | 5/2011 | Russ |
| 8,424,280 | B2 | 4/2013 | Moore et al. |
| 8,845,485 | B2 | 9/2014 | Smithson et al. |
| 9,994,332 | B2 | 6/2018 | Ullyott et al. |
| 10,240,521 | B2 | 3/2019 | Jones et al. |
| 10,501,200 | B2 | 12/2019 | Ullyott et al. |
| 10,850,863 | B2 | 12/2020 | Bisson et al. |
| 10,934,930 | B2 | 3/2021 | Jones et al. |
| 10,974,844 | B2 | 4/2021 | White |
| 10,988,266 | B2* | 4/2021 | White ................... B64D 41/00 |
| 11,034,463 | B2 | 6/2021 | White |
| 11,226,026 | B2 | 1/2022 | Bortoli et al. |
| 2010/0222971 | A1* | 9/2010 | Takahashi ............. F16H 61/702 701/51 |
| 2013/0239580 | A1* | 9/2013 | Corson ..................... F02C 7/26 60/788 |
| 2016/0348788 | A1* | 12/2016 | Lemmers, Jr. .......... F16H 47/04 |
| 2017/0037775 | A1* | 2/2017 | Jones ........................ F02C 7/36 |
| 2020/0102885 | A1 | 4/2020 | Kupratis et al. |
| 2020/0215922 | A1* | 7/2020 | Sawata .................... H02P 9/14 |
| 2020/0256431 | A1 | 8/2020 | Duong et al. |
| 2021/0351731 | A1 | 11/2021 | Koenig et al. |
| 2022/0003170 | A1* | 1/2022 | Matsuda ............... F16H 61/702 |

OTHER PUBLICATIONS

Search Report issued in European Patent Application No. 23166404.6; filed Apr. 3, 2023; dated Aug. 22, 2023 (7 pages).

* cited by examiner

MULTI-SPEED TRANSMISSION TO CONTROL VARIABLE APU SPEED AND CONSTANT GENERATOR OUTPUT FREQUENCY

BACKGROUND

Embodiments of the present disclosure are directed generally to aircraft systems, and more specifically, to aircraft electric power generation systems.

Aircrafts are known to employ an auxiliary power unit (APU) that is rotatably coupled to a direct drive generator to generate electric power for powering the aircraft. During operation, the APU drive shaft rotates to drive the generator, and the generator outputs alternating current (AC) electrical power in response to the rotation of the APU drive shaft. The rotational speed of the APU directly controls the frequency of the power output from the generator. For example, reducing the rotational speed of the APU reduces the frequency of power output from the generator while increasing the speed of the APU increases the frequency of power output from the generator. Aircrafts typically operate according to standardized power characteristics (e.g., 400 Hz). Therefore, the APU is controlled so that the APU drive shaft rotates at a fixed speed in order to produce and sustain a targeted output power frequency (e.g., 400 Hz) to meet the standardized power characteristics.

BRIEF DESCRIPTION

According to a non-limiting embodiment, an aircraft power system includes an auxiliary power unit (APU), a transmission unit, and a generator. The APU is configured to output a first APU rotational power in response to determining a first condition and a second APU rotational power in response to a determining a second condition. The transmission unit is configured to receive the first APU rotational output power from the APU. The transmission unit outputs a transmission rotational power based on the first APU rotational output power and outputs the transmission rotational power based on the second APU rotational output power. The generator receives the transmission rotational power and produces an alternating current (AC) voltage having a target frequency based on the transmission rotational power.

In addition to one or more of the features described herein, or as an alternative, further embodiments may include a feature, wherein the APU comprises drive shaft rotatably coupled between the APU and the transmission unit, the drive shaft configured to rotate at a first rotational speed so as to deliver the first APU rotational output power and to rotate at a second rotational speed so as to deliver the second APU rotational output power.

In addition to one or more of the features described herein, or as an alternative, further embodiments may include a feature, the aircraft power system further comprises a transmission controller in signal communication with the transmission unit, the transmission controller configured to determine a rotational speed of the drive shaft and control the transmission unit to produce the transmission rotational power based on the rotational speed of the drive shaft.

In addition to one or more of the features described herein, or as an alternative, further embodiments may include a feature, wherein the transmission controller controls the transmission unit to maintain the transmission rotational power delivered to the generator in response determining a change in the rotational speed of the drive shaft.

The aircraft power system of claim 4, the aircraft power system further comprises a generator input shaft coupled between the transmission unit and the generator, wherein the transmission unit rotates the generator input shaft according to a targeted rotational speed that produces the transmission rotational power.

In addition to one or more of the features described herein, or as an alternative, further embodiments may include a feature, wherein the transmission unit comprises a main transmission shaft, a first gear arrangement, a second gear arrangement, and a clutch. The main transmission shaft is rotatably coupled to the generator drive shaft. The first gear arrangement is coupled to the main transmission shaft. The first gear arrangement and defines a first gear ratio configured to rotate the main transmission shaft at a targeted rotational speed that produces the transmission rotational power in response to rotating the drive shaft at the first rotational speed. The second gear arrangement is coupled to the main transmission shaft and defines a second gear ratio different from the first gear ratio. The second gear ratio is configured to rotate the main transmission shaft at the targeted rotational speed that produces the transmission rotational power in response to rotating the drive shaft at the second rotational speed. The clutch is configured to move between a first position and a second position. The clutch engages the first gear arrangement when moved into the first position and engages the second gear arrangement when moved into the second position.

In addition to one or more of the features described herein, or as an alternative, further embodiments may include a feature, wherein the APU comprises a gas turbine engine and a drive shaft. The drive shaft includes a first end rotatably coupled to the gas turbine engine and an opposing second end rotatably coupled to the transmission unit to deliver the first APU rotational power and the second APU rotational power.

The aircraft power system of claim 7, the aircraft power system further comprises an APU controller in signal communication with the gas turbine engine, the APU controller configured to control the gas turbine engine to rotate the drive shaft at a first rotational speed to produce the first APU rotational power in response to detecting a first condition, and to control the gas turbine engine to rotate the drive shaft at a second rotational speed to produce the second APU rotational power in response to detecting a second condition.

In addition to one or more of the features described herein, or as an alternative, further embodiments may include a feature, wherein the transmission controller moves the clutch into the first position in response to determining the first rotational speed and moves the clutch into the second position in response to determining the second rotational speed.

In addition to one or more of the features described herein, or as an alternative, further embodiments may include a feature, wherein the first condition is a first altitude and the second condition is a second altitude different from the first altitude.

According to yet another non-limiting embodiment, a method of controlling an aircraft power system comprises outputting a first APU rotational power from an auxiliary power unit (APU) in response to the presence of a first condition by the APU and outputting a second APU rotational power from the APU in response to the presence of a second condition. The method further comprises receiving the first APU rotational output power by a transmission unit configured to receive. The method further comprises outputting a transmission rotational power from the transmission unit based on the first APU rotational output power and to outputting the transmission rotational power based on the second APU rotational output power. The method further comprises delivering the transmission rotational power to a generator and producing, by the generator, an alternating current (AC) voltage having a target frequency based on the transmission rotational power.

In addition to one or more of the features described herein, or as an alternative embodiment, the method further comprises rotating a drive shaft rotatably coupled between the APU and the transmission unit at a first rotational speed so as to deliver the first APU rotational output power and to rotating the drive shaft at a second rotational speed so as to deliver the second APU rotational output power.

In addition to one or more of the features described herein, or as an alternative embodiment, the method further comprises determining a rotational speed of the drive shaft using a transmission controller in signal communication with the transmission unit; and controlling the transmission unit using the transmission controller to produce the transmission rotational power based on the rotational speed of the drive shaft.

In addition to one or more of the features described herein, or as an alternative embodiment, the method further comprises controlling the transmission unit using the transmission controller to maintain the transmission rotational power delivered to the generator in response determining a change in the rotational speed of the drive shaft.

In addition to one or more of the features described herein, or as an alternative embodiment, the method further comprises rotating a generator input shaft coupled between the transmission unit and the generator via the transmission unit according to a targeted rotational speed that produces the transmission rotational power.

In addition to one or more of the features described herein, or as an alternative embodiment, the method further comprises coupling a main transmission shaft rotatably to the generator drive shaft using one of a first gear arrangement that defines a first gear ratio or a second gear arrangement that defines a second gear ratio. The method further comprises selecting the first gear arrangement using a clutch in response to rotating the drive shaft at the first rotational speed and rotating the main transmission shaft at a targeted rotational speed using the first gear arrangement to produce the transmission rotational power. The method further comprises selecting the second gear arrangement using the clutch in response to rotating the drive shaft at the second rotational speed and rotating the main transmission shaft at the targeted rotational speed using the second gear arrangement to produce the transmission rotational power.

In addition to one or more of the features described herein, or as an alternative embodiment, the method further comprises a feature, wherein the first condition is a first altitude and the second condition is a second altitude different from the first altitude.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
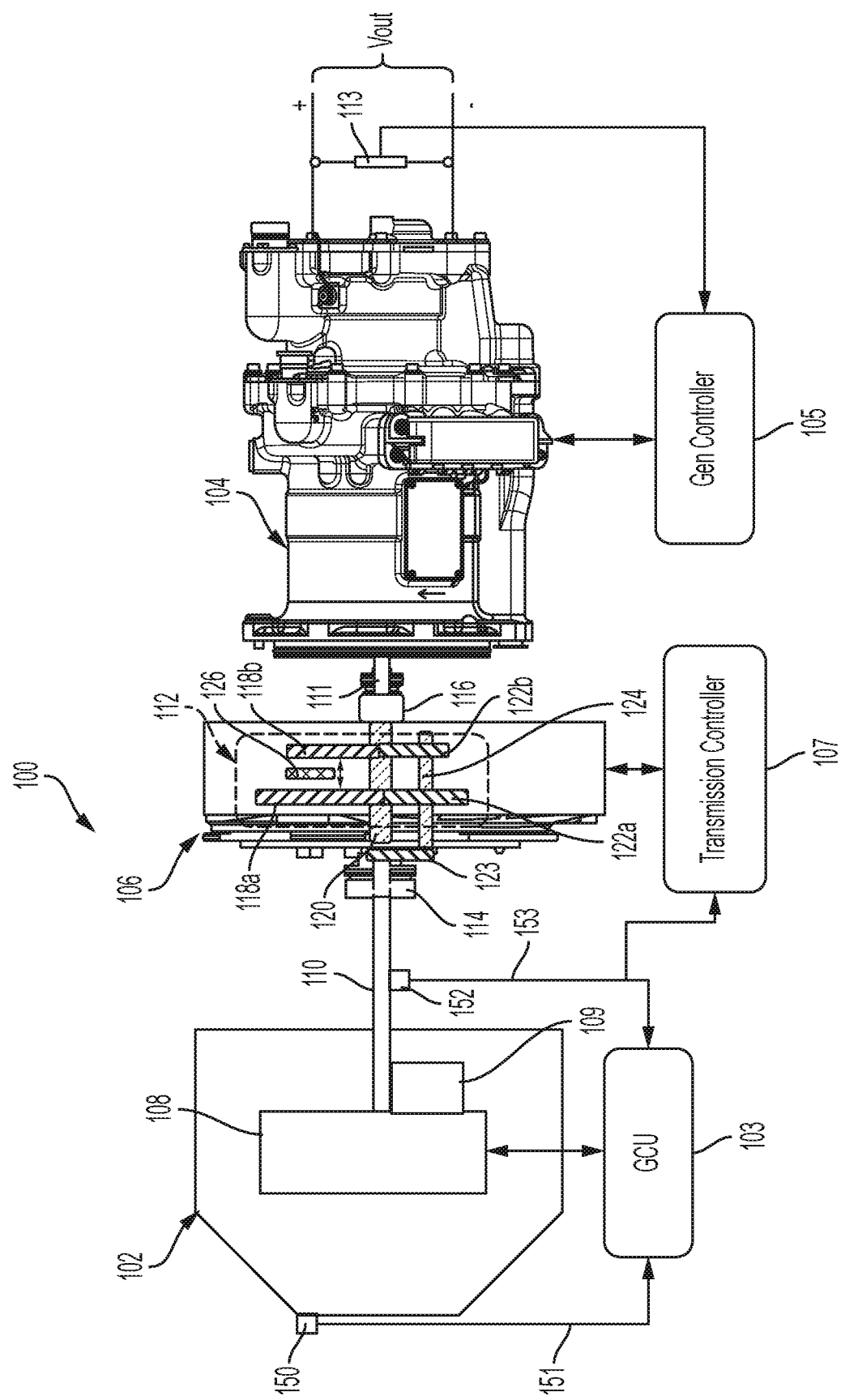
FIG. 1 is a block diagram illustrating an aircraft power system according to a non-limiting embodiment.

A detailed description of one or more embodiments of the disclosed apparatus and method are presented herein by way of exemplification and not limitation with reference to the Figures. The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

Turning now to an overview of the technology related to the present disclosure, the APU (e.g., the APU engine) requires fuel to drive the APU drive shaft and is a significant source of aircraft fuel consumption. Therefore, changing the operating speed of the APU varies its fuel consumption. The APU drive shaft implemented in a conventional APU-generator arrangement is coupled directly between the APU and the generator. Thus, the frequency of the power output from the generator is directly dependent on the operational speed of the APU. This arrangement, however, prevents varying the operating speed of APU because doing so will cause the frequency of the power output from the generator to drift from the aircraft target frequency (e.g., 400 Hz).

Different altitudes affect the power output of an APU. For example, power output is lower at higher altitudes such as high altitude (e.g., 30,000 ft.) compared to low altitudes such as sea level, for example. To compensate for differences in altitudes, the size, specifications, and fuel consumption of the APU are designed according to high altitude conditions to ensure sufficient output power is provided at both sea level and high altitudes. At sea level, however, the APU is operated at higher operational speeds than necessary resulting in fuel consumption inefficiency. As discussed above, the operating speed of APU cannot be changed because doing so will cause the frequency of the power output from the generator to drift from the aircraft target frequency (e.g., 400 Hz). Consequently, the fuel efficiency of a conventional APU cannot be effectively improved.

Various non-limiting embodiments of the present disclosure provides an aircraft power system that includes a transmission unit coupled between the APU drive shaft and a direct drive generator (described herein as a "generator"). The transmission unit is configured to provide the generator with a targeted input rotational power and to maintain the targeted input rotational power while the operating speed of the APU (e.g., the APU drive shaft) is changed according to different aircraft conditions (e.g., sea level versus high altitudes (e.g., 30,000 ft), different surrounding temperature conditions, etc.). In this manner, the operating speed of the APU can be varied to improve fuel efficiency while still transferring the rotational power necessary to maintain the aircraft target frequency of the power output from the generator.

Turning now to FIG. 1, an aircraft power system 100 is illustrated according to a non-limiting embodiment of the present disclosure. The power system 100 includes an APU 102, a generator 104, and a transmission unit 106. The APU 102 is in signal communication with a first controller referred to herein as an APU controller 103. The generator 104 is in signal communication with a second controller referred to herein as a "generator controller" 105. The transmission unit 106 is in signal communication with a third controller referred to here as a "transmission controller" 107. Each of the controllers 103, 105 and 107 can include memory and a processor configured to execute algorithms and computer-readable program instructions stored in the memory. Although three independent controllers 103, 105 and 107 are illustrated, it should be appreciated that the APU controller 103, the generator controller 105, and the transmission controller 107 can be embedded or integrated together in a single controller. It should be appreciated that two or more of the controllers 103, 105 and 107 are in signal communication with one another to exchange various data, measurements and/or calculations.

The APU 102 includes a fuel consuming gas turbine engine 108, a gearbox 109, and an APU drive shaft 110. The gas turbine engine 108 operates to rotate the APU drive shaft 110 in response to an intake of fuel. The amount of fuel consumed by the gas turbine engine 108 controls the operational speed of the APU 102. For example, increasing the fuel consumption of the gas turbine engine 108 increases the rotational speed of the APU drive shaft 110, while reducing the fuel consumption decreases the rotational speed of the APU drive shaft 110. The APU gearbox 109 gearbox transfers power from the APU drive shaft 110 to engine accessories including, but not limited to, a fuel control unit, a lubrication system, and a cooling fan. In some embodiments, the gearbox is also coupled to a starter motor through a gear train to perform the starting function of the APU 102.

The APU controller 103 is in signal communication with the 108 gas turbine engine 108, an altitude sensor 150, and a rotation sensor 152. In one or more non-limiting embodiments, the APU controller 103 can be implemented as a Full Authority Digital Engine Control (FADEC) and can determine an altitude based on measured altitude readings 151 output from the altitude sensor 150 and can determine a rotational speed of the drive shaft 110 based on measured rotational readings (rotations per minute (RPM)) 153 output from the rotation sensor 152. Although a rotation sensor 152 is described, it should be appreciated that the APU controller 103 can also calculate a rotational speeds of the drive shaft 110 based on the operation of the engine, e.g., the fuel consumption of the engine.

In one or more non-limiting embodiments, the APU controller 103 can determine changing altitudes based on the measured altitude readings and output a speed control signal that adjusts operating speed of the APU engine 108 based on the a given altitude. For example, the APU 102 can operate the APU engine 108 at a first operating speed that rotates the drive shaft 110 at a first rotational speed (e.g., 21,630 RPM) at a lower altitude and a second operating speed (e.g. 24,034 RPM) that at a higher altitude. In this manner, the APU 102 can provide the necessary power output at high altitudes, and reduce power output at low altitudes so as to improve fuel consumption efficiency. In one or more non-limiting embodiments, the GCU 108 can store an APU look-up table (LUT) that maps a given altitude or altitude range to an APU operating condition. The APU operating condition can include, but is not limited to, an amount of fuel delivered to the APU engine 108, an operating speed of the APU engine 108, and a output rotational speed of the drive shaft 110.

The generator 104 is configured to receive input rotational power via a generator drive shaft 111. Rotation of the drive shaft 111 can generate high-voltage AC electrical power (e.g., 115 volts) having an output frequency that is a function of an excitation frequency and a rotational speed of the generator drive shaft 111. For example, the generator 104 can be implemented using a 3-phase winding on a generator rotor and a 3-phase winding on a generator stator. The rotation of the generator drive shaft 111 controls a frequency input to the rotor and the speed of rotation of the rotor, both of which dictate the output frequency of the power output from the generator 104. It should be appreciated, however, that other suitable configurations for implementing the generator 104 is contemplated without departing from the scope of the present disclosure. The high-voltage AC output from the generator 104 can be converted into a direct current (DC) voltage and/or a conditioned AC voltage (e.g., a lower AC voltage).

The generator controller 105 is in signal communication with the generator 104 and a voltage sensor 113. The voltage sensor 113 measures the AC output of the generator 104 and delivers the measured AC output to the generator controller 105. The controller 105 utilizes the measured AC output to determine the voltage level of the AC output, the current level output from the generator 104 and/or the frequency of the AC output. In this manner, the generator controller 105 can monitor the frequency of the AC output and control the generator (e.g., the 3-phase generator rotor) to maintain a targeted output frequency (e.g., 400 Hz).

According to a non-limiting embodiment, the transmission unit 106 is mechanically coupled between the APU 102 and the generator 104, and is configured to deliver input rotational power to the generator 104. The transmission unit 106 includes a gear assembly 112, an input hub 114, and an output hub 116. The gear assembly 112 includes a plurality of drive gears 118a and 118b, a main transmission shaft 120, a plurality of secondary gears 122, one or more secondary shafts 124, and a clutch 126. It should be appreciated that additional gears and or shafts can be included in the transmission unit to facilitate the transfer of rotational power from the APU 102 to the generator 104 as understood by one of ordains skill in the art. In one or more non-limiting embodiments, gear changes (e.g., output/input speed change) can also be accomplished via breaking or synchronizing members of an epicyclic differential as understood by one of ordinary skill in the art.

The drive gears 118a and 118b are rotatably coupled to the main transmission shaft 120 and rotate in response to rotation of the main transmission shaft 120. The gearing (e.g., a toothed arrangement) of a first drive gear 118a engages gearing of a first secondary gear 122a and the gearing of a second drive gear 118b engages gearing of a second secondary gear 122b. The diameter of the first drive gear 118a is different with respect to the diameter of the second drive gear 118b such that a relationship between the first drive gear 118a and first secondary gear 122a defines a first gear ratio and a first speed ratio. Likewise, the relationship between the second drive gear 118b and second secondary gear 122b defines a second gear ratio different from the first gear ratio and a second speed ratio different from the first speed ratio.

The different gear ratios and speed ratios allow the transmission unit 106 to maintain a rotational power output from the transmission unit 106 while changing a rotational speed of the APU drive shaft 110. The rotational power output from the transmission unit 106 can be delivered as a target rotational speed via the input generator shaft 111. When the generator 104 is implemented as a two-pole synchronous generator, the target rotational speed of the input generator shaft 111 can be, for example, 24,034 RPM. When the generator 104 is implemented as a four-pole synchronous generator, the target rotational speed of the input generator shaft 111 can be, for example, 12,017 RPM. When the generator 104 is implemented as a six-pole synchronous generator, the target rotational speed of the input generator shaft 111 can be, for example, 8,011 RPM. When the generator 104 is implemented as an eight-pole synchronous generator, the target rotational speed of the input generator shaft 111 can be, for example, 6,008 RPM.

For any amount of the poles in the examples described herein, the first gear ratio can be selected such that the transmission unit 106 outputs the target rotational power (e.g., rotates the input generator shaft 111 at 24,034 RPM, 12,017 RPM, 8,011 RPM, 6,008 RPM, etc.) based on a first input rotation provided by the drive shaft 110 (e.g., 21,630 RPM). The second gear ratio can be selected such that the transmission unit 106 outputs the same target rotational power (i.e., rotates the input generator shaft 111 at 24,034 RPM, 12,017 RPM, 8,011 RPM, 6,008 RPM, etc.)), but at a different input rotation provided by the drive shaft 110 (e.g. 24,034 RPM). In this manner, the operating speed of the APU 102 (e.g., the rotational speed of the drive shaft 110) can be changed or varied while the transmission unit 106 maintains the target output rotational power (e.g., maintains the targeted RPM of the input generator shaft 111) input to the generator 104.

Control signals generated by the transmission controller 107 can be used to control the movement of the clutch 122 (as indicated by the double arrow). Accordingly, the transmission controller 107 can receive one or more clutch inputs indicative of a condition, and based on the clutch input can position the clutch 126 to engage one of the selected drive gears 118a and 118b thereby controlling the rotational power output from the transition. For example, the transmission controller 107 can output a control signal to position the clutch 126 so that it engages the first drive gear 118a and increases the rotational speed of the transmission shaft 120. On the other hand, the transmission controller 107 can output the control signal to position the clutch 126 so that it engages the second drive gear 118a and decreases the rotational speed of the transmission shaft 120.

In one or more non-limiting embodiments, the transmission controller 107 is in signal communication with the rotation sensor 152 to determine the rotational speed (e.g., RPMs) 153 of the drive shaft 110. The transmission controller 107 can store a transmission look-up table (LUT) that maps a given input rotation speed to a given drive gear (e.g., 118a and 118b) included in the transmission unit 106. For example, a first input rotation speed (e.g., 21,630 RPM) can be mapped to drive gear 118a and a second input rotation speed (e.g. 24,034 RPM) can be mapped to drive gear 118b. Accordingly, the transmission unit 106 can output a control signal that positions the clutch 126 to engage the first drive gear 118a in response to detecting the first input rotation speed (e.g., 21,630 RPM) and can output a control signal that positions the clutch 126 to engage the second drive gear 118b in response to detecting the second input rotation speed (e.g. 24,034 RPM).

A first end of the APU drive shaft 110 is coupled to the gas turbine engine 108, while an opposing second end of the APU drive shaft 110 is supported by the input hub 112 and is rotatably coupled to transfer gear arrangement 123. The transfer gear arrangement 123 is also rotatably coupled to the secondary shaft 124. In this manner, changing or varying the rotational speed of the APU drive shaft 110 in turn changes or varies the rotational speed of the secondary shaft 124. However, the first drive shaft 118a or the second drive shaft 118b can be selectively engaged as described herein to rotate the main transmission shaft 120 at a target speed the speed of the APU drive shaft 110 is changed or adjusted according to different conditions such as changing altitudes and/or changing surrounding temperatures.

The output hub 116 is rotatably coupled to one end of the transmission shaft 120 along with a first end of the generator drive shaft 111. The opposing end of the generator drive shaft 111 is rotatably coupled to the generator 104. In other non-limiting embodiments, the main transmission shaft 120 can be rotatably coupled to the generator 104 rather than employed the intervening generator drive shaft 111. As described herein, the generator 104 can be implemented using a 3-phase winding on a generator rotor and a 3-phase winding on a generator stator. Accordingly, the rotation of the generator drive shaft 111 controls a frequency input to the rotor and the speed of rotation of the rotor, both of which dictate the output frequency of the power output from the generator 104. Because the main transmission shaft 120 and the generator drive shaft 111 (when employed) rotate independent of the main drive shaft 110, the operation speed of the APU engine 108 can be changed or varied without affecting the rotational input power delivered to generator 104. Accordingly, the operating speed of the APU 102 can be adjusted according to different conditions to improve fuel consumption efficiency, while the transmission unit 106 selects the drive gear 118a or 118b necessary for driving the generator drive shaft 111 at a rotational speed necessary to produce and sustain a targeted output power frequency (e.g., 400 Hz).

Figure 2:
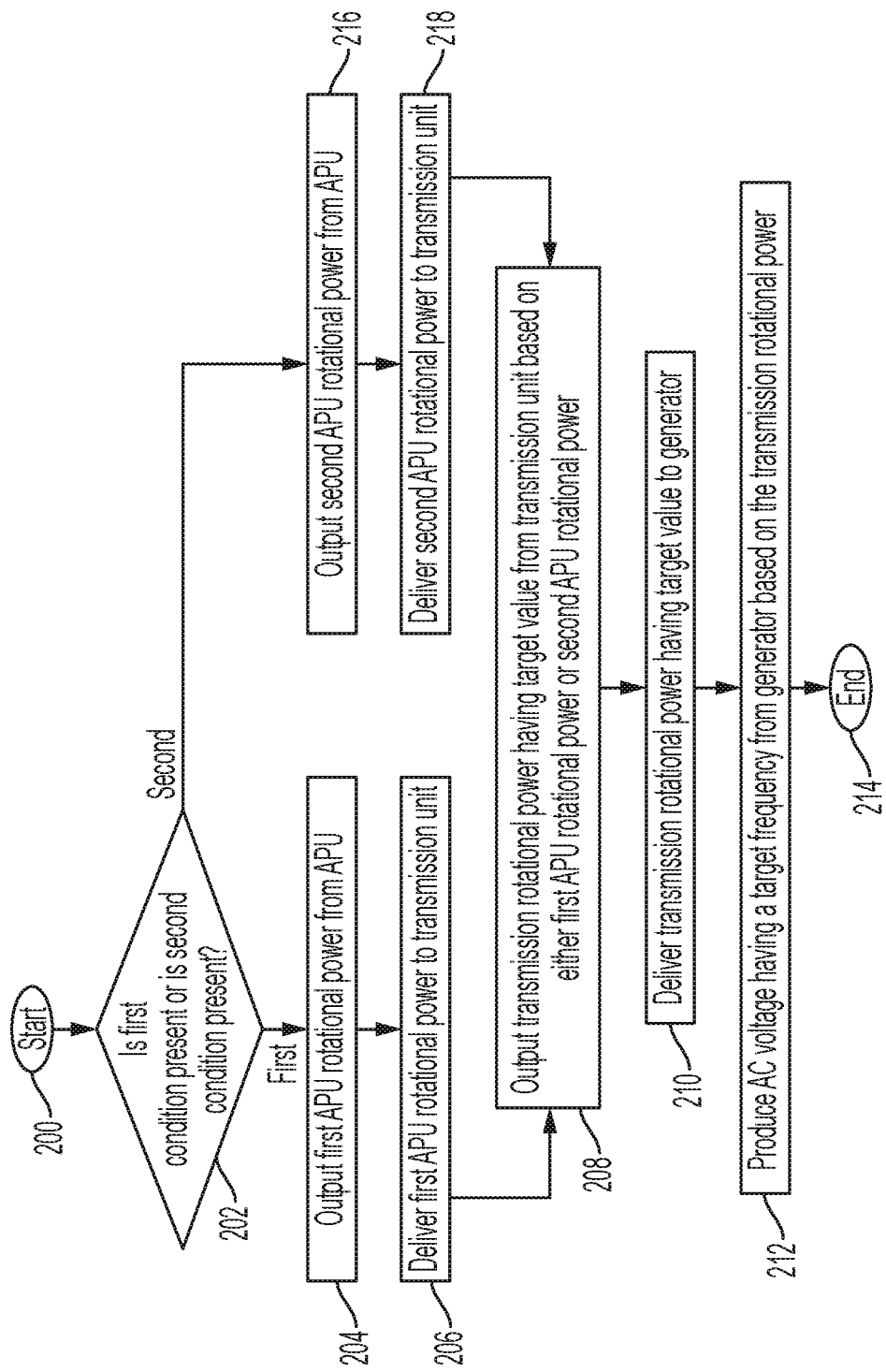
FIG. 2 is a flow diagram illustrating a method of controlling an aircraft power system according to a non-limiting embodiment.

Turning now to FIG. 2, a method of controlling a power system of an aircraft is illustrated according to a non-limiting embodiment. The method begins at operation 200, and at operation 202 the aircraft is determined to be operating during a first condition or a second condition. In one or more non-limiting embodiments, the first condition is a first altitude (e.g., sea level) and the second condition is a second altitude (e.g., 40,000 ft) different from the first condition. When the aircraft is operating during the first condition, the APU outputs a first APU rotational power at operation 204. In one or more non-limiting embodiments, the first APU rotational power is a first rotational speed (RPM) of about 21,630 RPM, for example. At operation 206, the first APU rotational power is delivered to a transmission unit. At operation 208, the transmission unit outputs a transmission rotational power having a target value based on the first APU rotational power. In one or more non-limiting embodiments, the transmission rotational power having the target value is a rotational speed (RPM) having a target rotational speed. At operation 210, the transmission rotational power having the target value is delivered to the aircraft generator. At operation 212, the generator produces an AC voltage having a target frequency (e.g., about 400 Hz) based on the transmission rotational power, and the method ends at operation 214.

When the aircraft is determined to be operating during the second condition at operation 202, the APU outputs a second APU rotational power at operation 216. In one or more non-limiting embodiments, the second APU rotational power is a second rotational speed (RPM) of about 24,030 RPM, for example. At operation 218, the second APU rotational power is delivered to the transmission unit. Proceeding to operation 208, the transmission unit outputs the transmission rotational power having the target value based on the second APU rotational power. At operation 210, the transmission rotational power having the target value is delivered to the aircraft generator. At operation 212, the generator produces an AC voltage having the target frequency (e.g., about 400 Hz) based on the transmission rotational power, and the method ends at operation 214.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein. It should be appreciated that relative positional terms such as "forward," "aft," "upper," "lower," "above," "below," and the like are with reference to normal operational attitude and should not be considered otherwise limiting.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft power system comprising:
    an auxiliary power unit (APU) configured to output a first APU rotational power during a first condition and a second APU rotational power during a second condition different from the first condition;
    a transmission unit configured to receive the first APU rotational output power from the APU, the transmission unit configured to output a transmission rotational power based on the first APU rotational output power and to output the transmission rotational power based on the second APU rotational output power;
    a drive shaft rotatably coupled between the APU and the transmission unit, wherein the APU drives the drive shaft to rotate at a first rotational speed so as to deliver the first APU rotational output power and to rotate at a second rotational speed so as to deliver the second APU rotational output power; and
    a generator configured to receive the transmission rotational power and to produce an alternating current (AC) voltage having a target frequency based on the transmission rotational power, wherein the first condition is a first altitude range at which the APU drives the drive shaft at a first speed of about 21,630 rotations per minute (RPM) and the second condition is a second altitude range at which the APU drives the APU drive shaft at a second speed falling within a second speed range which ranges from about 24,030 RPM.

2. The aircraft power system of claim 1, further comprising a transmission controller in signal communication with the transmission unit, the transmission controller configured to determine a rotational speed of the drive shaft and control the transmission unit to produce the transmission rotational power based on the rotational speed of the drive shaft.

3. The aircraft power system of claim 2, wherein the transmission controller controls the transmission unit to maintain the transmission rotational power delivered to the generator in response determining a change in the rotational speed of the drive shaft.

4. The aircraft power system of claim 3, further comprising a generator input shaft coupled between the transmission unit and the generator, wherein the transmission unit rotates the generator input shaft according to a targeted rotational speed that produces the transmission rotational power.

5. The aircraft power system of claim 4, wherein the transmission unit comprises:
    a main transmission shaft rotatably coupled to the generator drive shaft;
    a first gear arrangement coupled to the main transmission shaft, the first gear arrangement defining a first gear ratio configured to rotate the main transmission shaft at a targeted rotational speed that produces the transmission rotational power in response to rotating the drive shaft at the first rotational speed;
    a second gear arrangement coupled to the main transmission shaft and defining a second gear ratio different from the first gear ratio, the second gear ratio configured to rotate the main transmission shaft at the targeted rotational speed that produces the transmission rotational power in response to rotating the drive shaft at the second rotational speed; and
    a clutch configured to move between a first position and a second position, wherein the clutch engages the first gear arrangement when moved into the first position and engages the second gear arrangement when moved into the second position.

6. The aircraft power system of claim 5, wherein the APU comprises:
    a gas turbine engine; and
    the drive shaft including a first end rotatably coupled to the gas turbine engine and an opposing second end rotatably coupled to the transmission unit to deliver the first APU rotational power and the second APU rotational power.

7. The aircraft power system of claim 6, further comprising an APU controller in signal communication with the gas turbine engine, the APU controller configured to control the gas turbine engine to rotate the drive shaft at the first rotational speed to produce the first APU rotational power in response to detecting the first condition, and to control the gas turbine engine to rotate the drive shaft at the second rotational speed to produce the second APU rotational power in response to detecting the second condition.

8. The aircraft power system of claim 7, wherein the transmission controller moves the clutch into the first position in response to determining the first rotational speed and moves the clutch into the second position in response to determining the second rotational speed.

9. The aircraft power system of claim 8, wherein the first condition is a first altitude and the second condition is a second altitude different from the first altitude.

10. A method of controlling a hydraulic control system of an aircraft, the method comprising:
    outputting a first APU rotational power from an auxiliary power unit (APU) in response to the aircraft operating during a first condition and outputting a second APU rotational power from the APU in response to the aircraft operating during a second condition;

delivering one of the first APU rotational power or the second APU rotational power to a transmission unit;

rotating a drive shaft rotatably coupled between the APU and the transmission unit at a first rotational speed so as to deliver the first APU rotational output power and rotating the drive shaft at a second rotational speed so as to deliver the second APU rotational output power;

outputting a transmission rotational power from the transmission unit based on the first APU rotational power and outputting the transmission rotational power based on the second APU rotational power; delivering the transmission rotational power to a generator; and producing, by the generator, an alternating current (AC) voltage having a target frequency based on the transmission rotational power, wherein the first condition is a first altitude range at which the APU drives the drive shaft at a first speed of about 21,630 rotations per minute (RPM) and the second condition is a second altitude range at which the APU drives the APU drive shaft at a second speed falling within a second speed range which ranges from about 24,030 RPM.

11. The method of claim 10, further comprising determining a rotational speed of the drive shaft using a transmission controller in signal communication with the transmission unit; and controlling the transmission unit using the transmission controller to produce the transmission rotational power based on a rotational speed of the drive shaft.

12. The method of claim 11, further comprising controlling the transmission unit using the transmission controller to maintain the transmission rotational power delivered to the generator in response determining a change in the rotational speed of the drive shaft.

13. The method of claim 12, further comprising rotating a generator input shaft coupled between the transmission unit and the generator via the transmission unit according to a targeted rotational speed that produces the transmission rotational power.

14. The method of claim 13, further comprising:

coupling a main transmission shaft rotatably to the generator drive shaft using one of a first gear arrangement that defines a first gear ratio or a second gear arrangement that defines a second gear ratio;

selecting the first gear arrangement using a clutch in response to rotating the drive shaft at the first rotational speed and rotating the main transmission shaft at a targeted rotational speed using the first gear arrangement to produce the transmission rotational power; and selecting the second gear arrangement using the clutch in response to rotating the drive shaft at the second rotational speed and rotating the main transmission shaft at the targeted rotational speed using the second gear arrangement to produce the transmission rotational power.

15. The method of claim 14, wherein the first condition is a first altitude and the second condition is a second altitude different from the first altitude.

* * * * *